United States Patent
Weng et al.

(10) Patent No.: US 9,308,842 B2
(45) Date of Patent: Apr. 12, 2016

(54) PYROTECHNIC FASTENER SEAT ARRANGEMENT FOR UNBELTED OCCUPANT PROTECTION

(71) Applicant: Ford Global Technologies, LLC, Dearborn, MI (US)

(72) Inventors: Tzu-Chen Weng, Troy, MI (US); Erika Kristin Low, Ann Arbor, MI (US); Djamal Eddine Midoun, Ann Arbor, MI (US); Se Kyoon Shin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/188,301

(22) Filed: Feb. 24, 2014

(65) Prior Publication Data

US 2015/0239373 A1  Aug. 27, 2015

(51) Int. Cl.
*B60N 2/42* (2006.01)
*B60R 21/00* (2006.01)
*B60N 2/427* (2006.01)

(52) U.S. Cl.
CPC ........ *B60N 2/42772* (2013.01); *B60N 2/42754* (2013.01); *B60N 2/4207* (2013.01); *B60N 2/427* (2013.01); *B60N 2/4221* (2013.01); *B60N 2/4279* (2013.01); *B60N 2/42709* (2013.01)

(58) Field of Classification Search
CPC .. B60N 2/2356; B60N 2/3031; B60N 2/3088; B60N 2/3093; B60N 2/3065; B60N 2/4221; B60N 2/4279; B60N 2/427; B60N 2/42709; B60N 2/4207; B60N 2/42772
USPC ............. 297/452.19, 452.18, 216.19, 216.17, 297/340, 341, 342, 362.14, 382, 344.15, 297/344.16, 344.17, 344.13, 216.1, 216.2
See application file for complete search history.

(56) References Cited

U.S. PATENT DOCUMENTS

| | | | | |
|---|---|---|---|---|
| 3,973,799 A | * | 8/1976 | Berg | 297/341 |
| 4,085,963 A | * | 4/1978 | Bullerdieck | B60N 2/4221 180/268 |
| 4,676,462 A | * | 6/1987 | Martin | B64D 25/02 244/122 AG |
| 4,957,321 A | * | 9/1990 | Martin et al. | 296/65.09 |
| 5,125,598 A | | 6/1992 | Fox | |
| 5,338,100 A | * | 8/1994 | Rees | 297/452.1 |
| 5,566,978 A | * | 10/1996 | Fleming | B60R 22/1951 188/377 |
| 6,170,898 B1 | * | 1/2001 | Cunningham et al. | 296/65.16 |

(Continued)

FOREIGN PATENT DOCUMENTS

| | | |
|---|---|---|
| DE | 19606605 A1 | 8/1997 |
| EP | 2436554 A1 | 4/2012 |

*Primary Examiner* — Chi Q Nguyen
(74) *Attorney, Agent, or Firm* — LeClairRyan

(57) ABSTRACT

A seat assembly including a seat pan that drops vertically in the event of a frontal impact event to help safeguard against the head of an unbelted seat occupant striking the headliner, windshield or other components of the vehicle. The seat assembly includes a seat pan attached to a seat track. The seat track further includes an attachment bracket. A swing linkage movably connects the seat pan with the seat track by a movable fastener. A slot is formed in the bracket through which at least a part of the movable fastener passes. A pyrotechnic fastener also attaches the swing linkage to the bracket. In a frontal impact event, the pyrotechnic fastener is caused to explode thus separating the pyrotechnic fastener into two parts and allowing the swing linkage and its attached seat pan to drop vertically relative to the seat track and lowering the unbelted occupant.

19 Claims, 6 Drawing Sheets

(56) References Cited

U.S. PATENT DOCUMENTS

Figure 1:
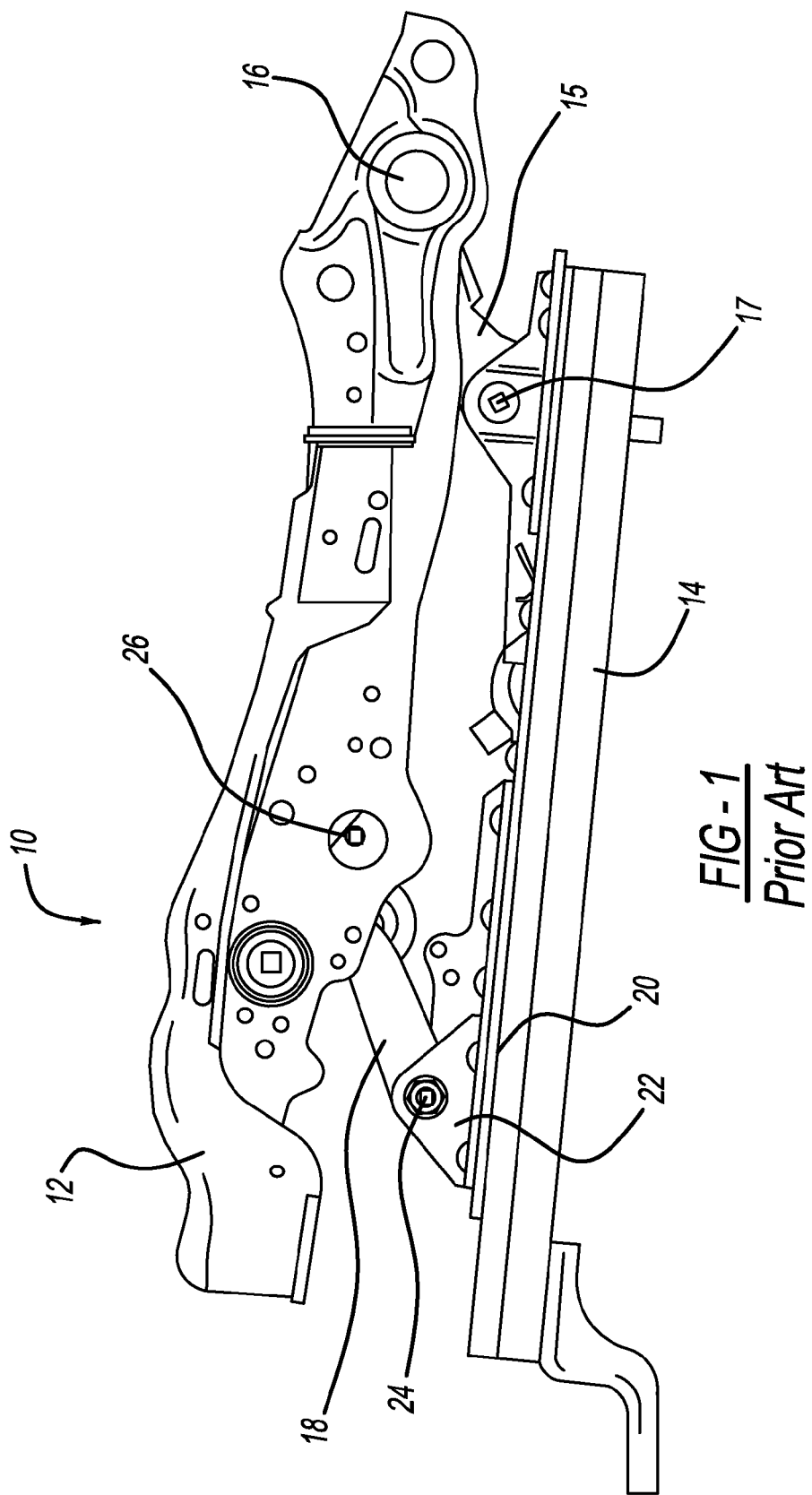

| | | | |
|---|---|---|---|
| 6,582,015 B2 | 6/2003 | Jessup et al. | |
| 6,629,575 B2 * | 10/2003 | Nikolov | B60N 2/4214 180/282 |
| 6,902,236 B2 * | 6/2005 | Tame | 297/335 |
| 7,121,624 B2 * | 10/2006 | Pejathaya et al. | 297/378.12 |
| 7,278,682 B2 | 10/2007 | Friedman et al. | |
| 8,038,198 B2 * | 10/2011 | Yamagishi | 296/90 |
| 8,096,616 B2 * | 1/2012 | Ventura et al. | 297/334 |
| 8,434,819 B2 * | 5/2013 | Guerrero | B60N 2/4221 297/216.1 |
| 2005/0006940 A1 * | 1/2005 | Yoshida | 297/378.12 |
| 2005/0242634 A1 * | 11/2005 | Serber | B60N 2/0745 297/216.1 |
| 2014/0062158 A1 * | 3/2014 | Line et al. | 297/378.1 |

* cited by examiner

PYROTECHNIC FASTENER SEAT ARRANGEMENT FOR UNBELTED OCCUPANT PROTECTION

TECHNICAL FIELD

The disclosed inventive concept relates generally to safety systems for vehicle seats. More particularly, the disclosed inventive concept relates to a seat having a pyrotechnic fastener attachment and swing linkage arrangement that allows the seat pan of a vehicle to drop vertically in an impact event.

BACKGROUND OF THE INVENTION

Under certain circumstances, particularly in a frontal impact event, some vehicles tend to rise. While the degree of rise of a vehicle may vary according to vehicle type, the rise is itself a common phenomenon. In such a situation an unbelted occupant tends to move vehicle forward toward the front of the seat. This is so because no belt is in use that would otherwise restrict forward movement. In addition, because a deployed airbag ordinarily presses against either the front or the side of the occupant and thus prevents the unbelted occupant from moving further forward, the vehicle rise can push an unbelted occupant upward inside the vehicle compartment.

Particularly, and according to known seat designs in today's vehicles, the rise of the vehicle in a frontal impact event results in a number of potential challenges to the unbelted seat occupant. A main concern is, if the seated occupant is unbelted, the head of the driver or of the front seat passenger may contact the roof, the visor, the headliner or the windshield during a frontal impact event.

Since the current seat design is constrained to be adjustable for all different impact modes, it may be that an adjustable seat pan height can significantly enhance unbelted occupant safety protection, in addition to the optimized restraints system. However, current seat designs do not permit for the adjustment of seat pan height in an impact event.

As in so many areas of vehicle technology, there is always room for improvement related to improving the safety of unbelted seat occupants in vehicles in an impact event.

SUMMARY OF THE INVENTION

The disclosed inventive concept overcomes the problems associated with known safety systems directed to unbelted seat occupants. The disclosed inventive concept provides a seat assembly for a vehicle that comprises a seat pan attached to a seat track.

The seat pan includes a rear portion and the seat track includes a rear portion. The rear portion of the seat pan is attached to the rear portion of the seat track by an arm. The seat track further includes an inner track and an attachment bracket attached to the inner track.

A swing linkage movably connects the seat pan with the seat track. The swing linkage is movably attached to the attachment bracket of the seat track by a movable fastener. A slot is formed in the bracket adjacent the movable fastener. The slot is formed substantially perpendicularly to the long axis of the seat track.

A pyrotechnic fastener also attaches the swing linkage to the bracket. In a frontal impact event, the pyrotechnic fastener is caused to fire thus separating the pyrotechnic fastener and allowing the swing linkage and the attached seat pan to drop vertically relative to the seat track and lowering the unbelted occupant. With the seat pan repositioned, the unbelted occupant's head is prevented from contacting any hard or soft surfaces inside the vehicle compartment.

The deployment of the pyrotechnic fastener may be calibrated based on a number of inputs. Accordingly the disclosed inventive concept offers among several advantages flexibility in adjusting the seat pan height in different impact situations for improved unbelted occupant safety protection.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 shows a side view of a seat pan and seat track arrangement according to the known art;

FIG. 2 illustrates a side view of a swing linkage for connecting the seat pan to the seat track according to the known art;

FIG. 3 is a side view of a swing linkage connecting a seat pan to a seat track according to the disclosed inventive concept;

FIG. 4 shows a sectional view of the swing linkage connected to the seat track taken along line 4-4 of FIG. 3 before an impact event;

FIG. 5 illustrates a side view of a seat pan and seat track arrangement according to the disclosed inventive concept;

FIG. 6 is similar to the view shown in FIG. 4 of the swing linkage in relation to the seat track but showing the pyrotechnic fastener being severed during an impact event and the swing linkage consequently being dropped vertically;

FIG. 7 is a side view of the swing linkage after the pyrotechnic fastener has been severed; and FIG. 8 is a side view of the seat pan and the seat track having the swing linkage shown in FIG. 5 but illustrating the seat pan having dropped to its lowered position following the severing of the pyrotechnic fastener after an impact event.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

In general, the disclosed invention provides a practical and economical solution to one of the problems related to providing safety to an unbelted seat occupant. The disclosed inventive concept overcomes the problems commonly associated with known designs.

FIG. 1 illustrates a seat assembly according to the prior art, generally illustrated as 10. The seat assembly 10 includes a seat pan 12 and a seat track 14. Toward the rear of the assembly 10 the seat pan 12 is attached to the seat track 14 at one end by an arm 15. The arm 15 is attached to the seat pan 12 by a fastener 16 and is attached to the seat track 14 by a fastener 17. Toward the front of the seat assembly 10 the seat pan 12 is attached to the seat track 14 by a swing linkage 18.

The seat track 14 includes an inner seat track 20. The inners seat track 20 includes a bracket 22. The bracket 22 is fastened to the inner seat track 20.

One end of the swing linkage 18 is attached to the upper portion of the bracket 22 by a fastener 24. The other end of the swing linkage 18 is attached to the seat pan 12 by a mechanical fastener 26.

Figure 2:
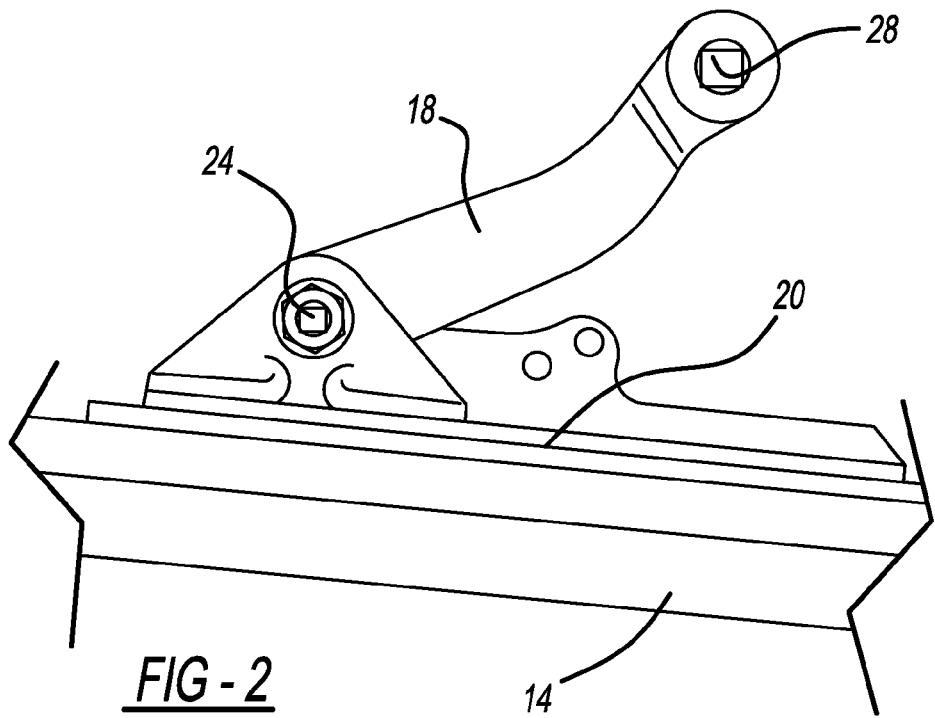

FIG. 2 illustrates a side view of the swing linkage 18 of the prior shown in FIG. 1 in relation to the bracket 22 and the inner seat track 20. The swing linkage 18 has a hole 28 formed in its uppermost end to accommodate the fastener 26 used to secure the swing linkage 18 to the seat pan 12.

As is understood by referring to FIGS. 1 and 2, the prior art teaches that the height of the seat pan 12 relative to the seat track 14 is substantially fixed. In an impact event of any type this arrangement, and the height defined thereby, is designed to remain intact.

Conversely, the disclosed inventive concept is designed to allow the forward end of the seat pan to drop vertically in a frontal impact event. Particularly, and with reference to FIGS. 3 through 8, the disclosed inventive concept is structured so as to overcome may of the challenges associated with known designs.

Figure 3:
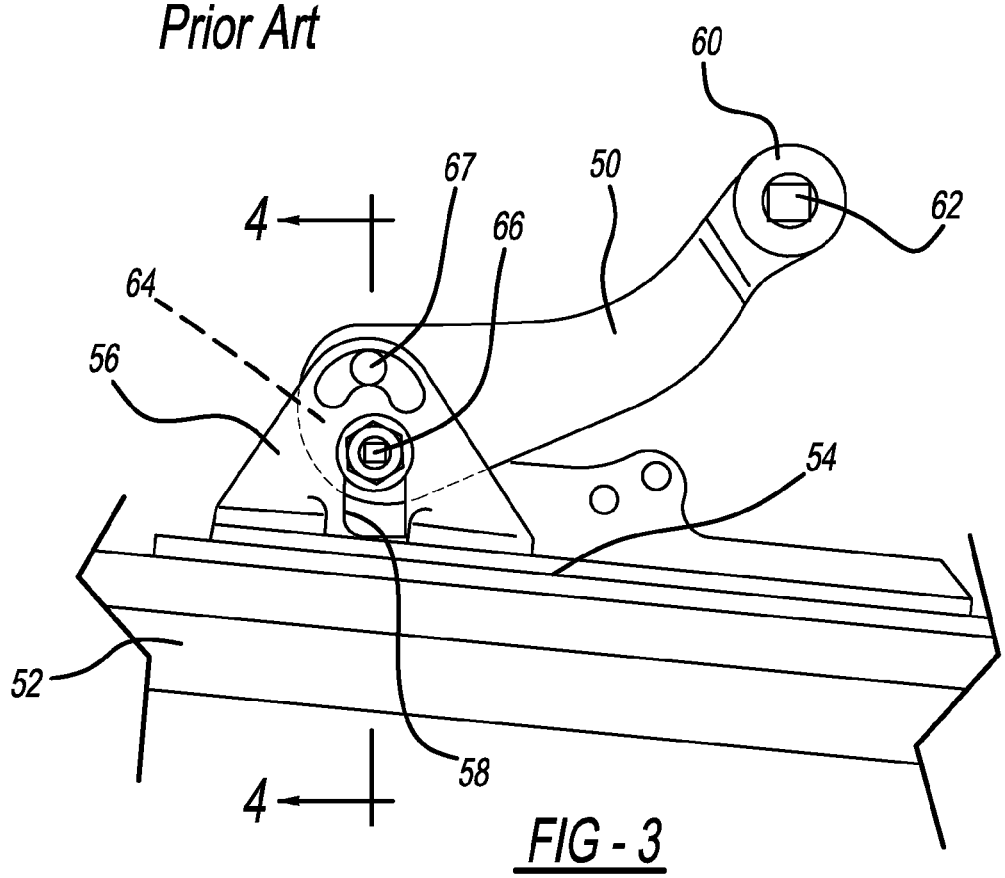

Referring to FIG. 3, a side view of a swing linkage 50 is shown. Also illustrated is a side view of a seat track 52 having an inner track 54. Attached to the inner track 54 is a bracket 56. The bracket 56 has formed therein a substantially vertical slot 58.

The swing linkage 50 has a rearward end 60 having a fastener hole 62 formed therein. The swing linkage 50 has a forward end 64. A fastener 65 attaches the swing linkage 50 to the bracket 56. The fastener 65 includes a bolt head 66. The width of the shaft of the fastener 65 is narrower than the width of the vertical slot 58 but the width of the bolt head 66 of the fastener 65 is wider than the width of the opening defined by the vertical slot 58.

A pyrotechnic fastener 67 attaches the swing linkage 50 to the bracket 56. The pyrotechnic fastener 67 is also known as an explosive bolt or as a pyro bolt. Typically a nut and bolt assembly, the pyrotechnic fastener 67 includes a pyrotechnic charge of some type (not shown) that is embedded within the bolt portion of the assembly. A common and non-limiting example of a pyrotechnic charge is RDX such as explosive nitroamine. As is known, the charge is ignited typically by a remote initiator 68 that sends an electric current to the pyrotechnic fastener 67 causing it to be severed.

Figure 4:
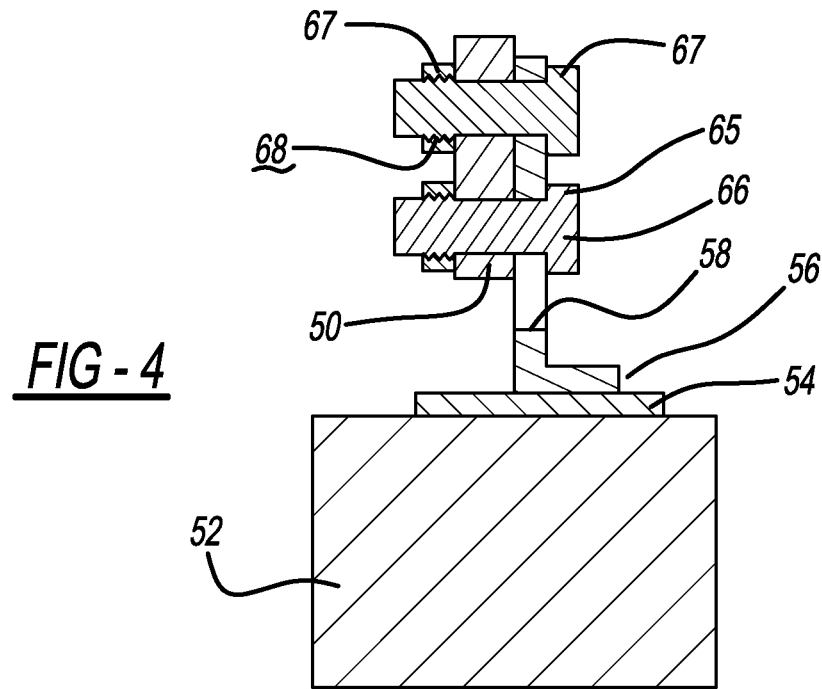

Referring to FIG. 4, an end view of the swing linkage 50, the seat track 52, and the bracket 56 is illustrated prior to an impact event. The pyrotechnic fastener 68 retains the swing linkage 50 in its raised position relative to the bracket 56 as would normally be the case. The fastener 66 is illustrated as also holding the swing linkage 50 relative to the bracket 56.

Figure 5:
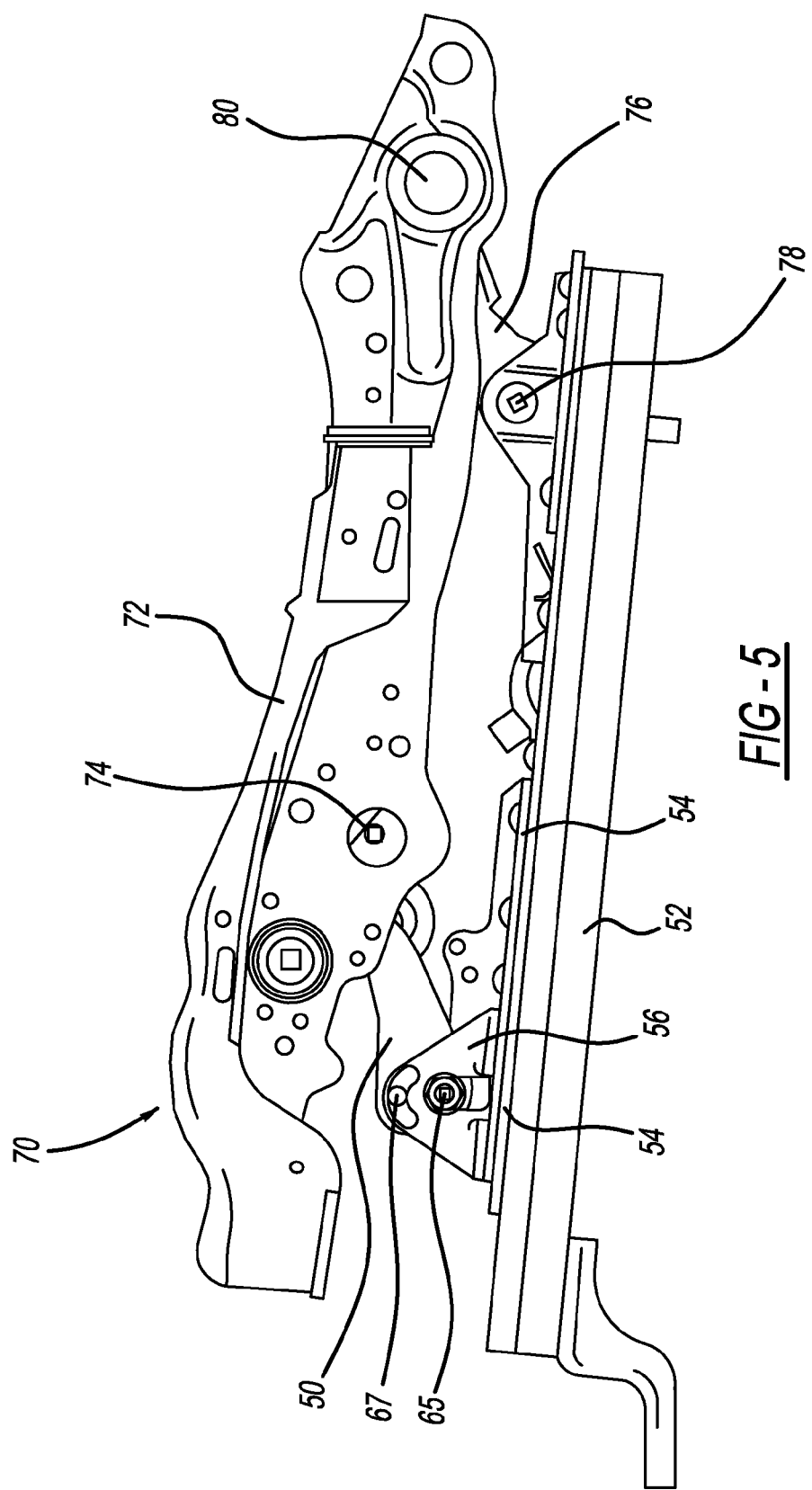
Figure 7:
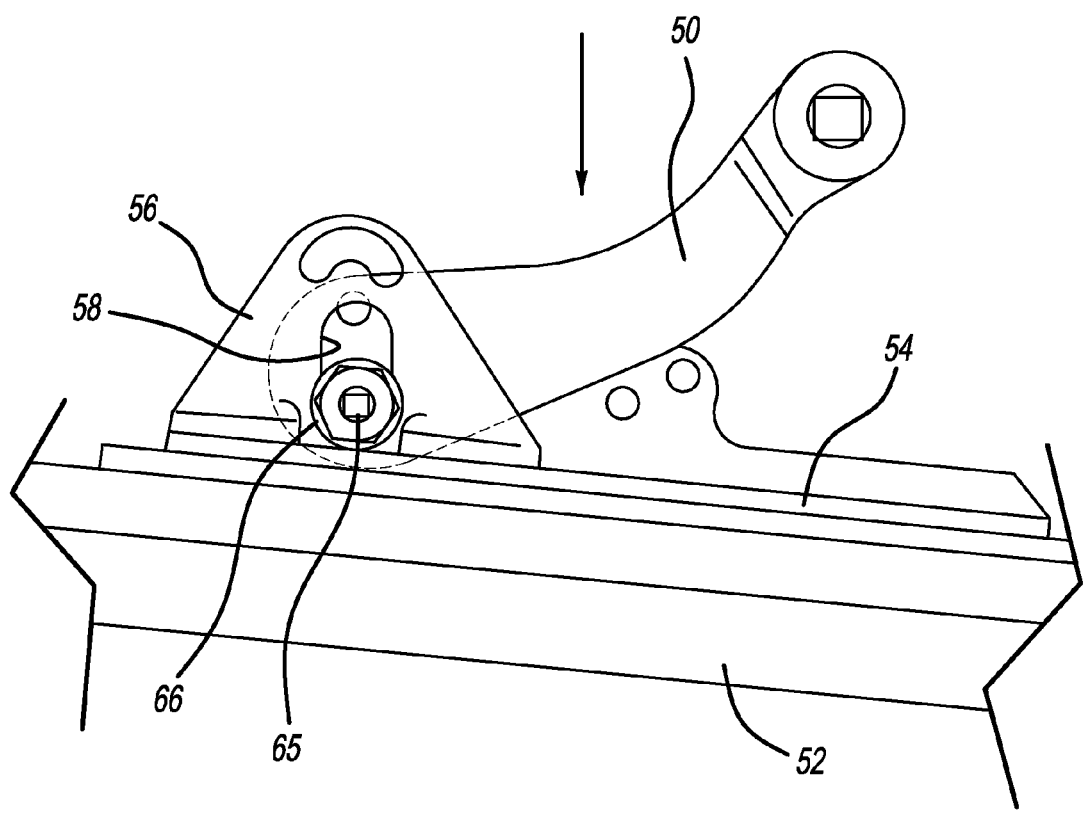

FIG. 5 illustrates a side view of an assembly, generally illustrated as 70, that incorporates the swing linkage 50 of the disclosed inventive concept. The assembly 70 includes a seat pan 72. The rearward end of the swing linkage 50 is attached to the seat pan 72 by a fastener 74. The seat pan 72 is also attached to the seat track 52 by an arm 76. The arm 76 is attached to the seat track 52 by a fastener 78. The arm 76 is attached to the seat pan 72 by a fastener 80.

Figure 6:
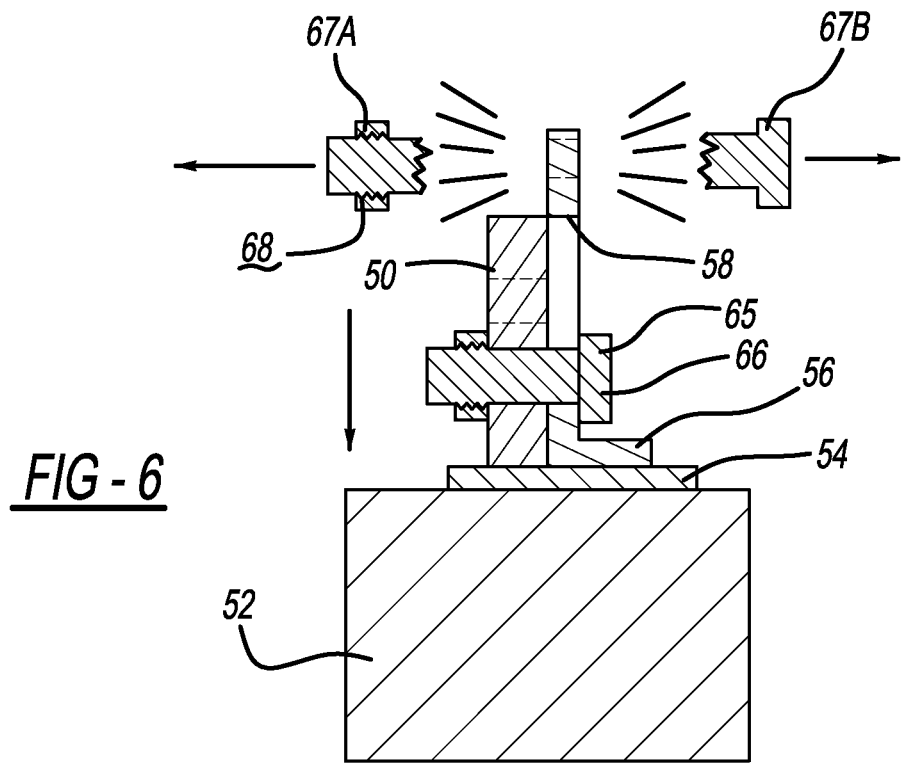

In a frontal impact event the remote igniter 68 is sent a signal by a central processing unit (not shown) that the impact occurred. The remote igniter 68 then sends an electric current to the pyrotechnic fastener 67 causing it to explode and sever into two parts, 67A and 67B, as illustrated in FIG. 6. The deployment of pyrotechnic fastener 67 can be calibrated according to specific vehicle.

With the pyrotechnic fastener 67 thus severed, the swing linkage 50 falls vertically as illustrated in FIG. 6. As shown also in FIG. 7, because the bolt head 66 of the shoulder of the fastener 65 is wider than the width of the vertical slot 58, the swing linkage 50 remains attached to the bracket 54.

Figure 8:
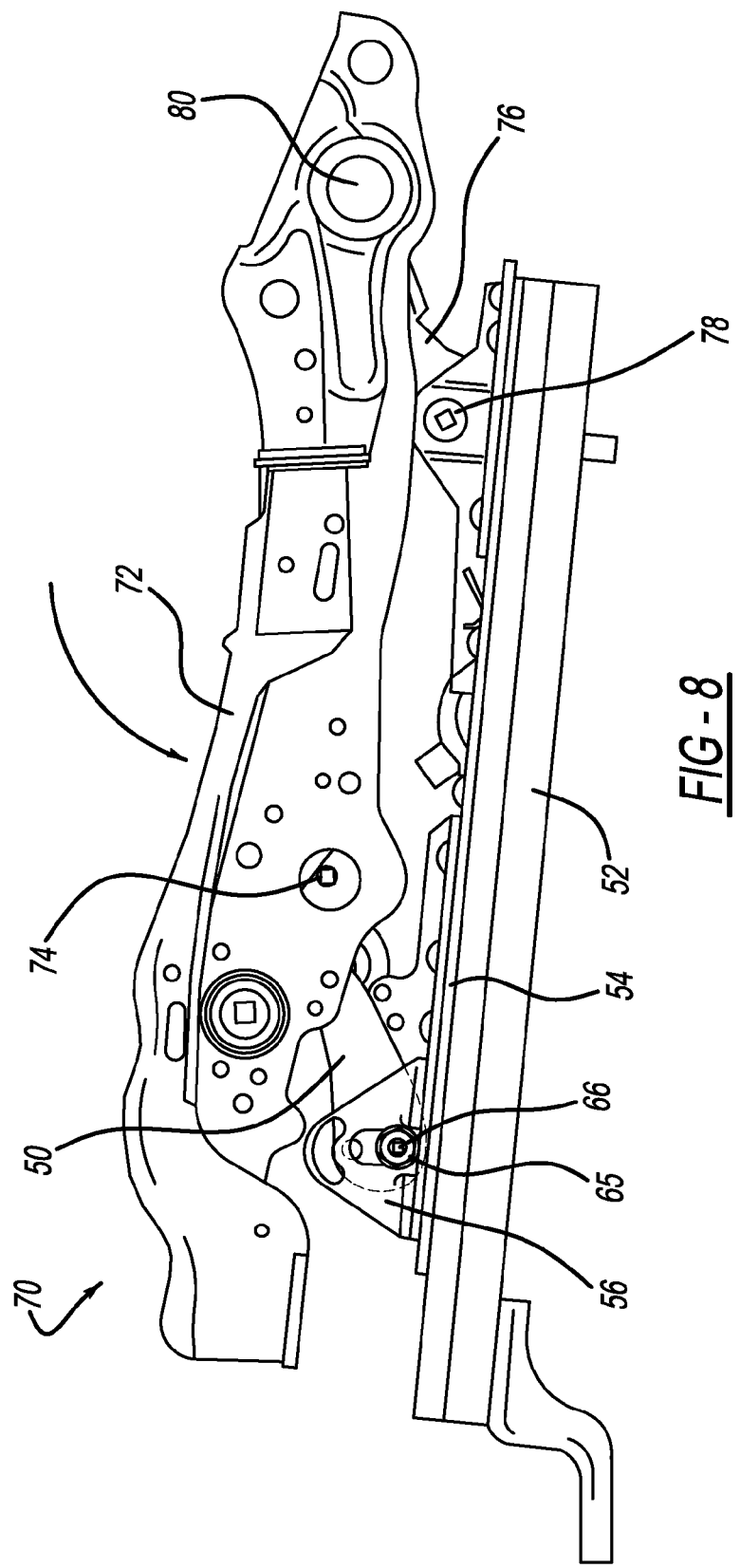

The result of the vertical drop of the swing linkage 50 on the profile of the assembly 70 is shown in FIG. 8 in which a side view of the seat pan 72 and the seat track 52 is shown. As illustrated, the forward part of the seat pan 72 is now vertically lower than its pre-impact state, thus demonstrating how the disclosed inventive concept precisely controls the height of the seat pan 72 for different crash conditions at specific times. The disclosed inventive concept allows the seat pan 72 to drop vertically relative to the seat track 52 while still remaining attached thereto.

Once the swing linkage 50 slides down relative to the bracket 56 the seat pan 72 will drop as well for the same distance, consequently lowering the pelvis of the unbelted seat occupant. The unbelted seat occupant is thus prevented from making contact with any hard or soft surfaces above the head inside the vehicle compartment in a frontal impact event. The disclosed inventive concept accordingly offers flexibility in adjusting the height of the seat pan 72 in different impact events for improved unbelted occupant safety protection.

The disclosed invention as set forth above overcomes the challenges faced by known seat systems in which unbelted occupants may be present. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A seat assembly for a vehicle comprising:
   a seat pan;
   a seat track;
   a bracket attached to said track;
   a swing linkage;
   a fastener attaching said swing linkage to said bracket;
   a slot formed in said bracket adjacent said fastener; and
   an explodable fastener having a pyrotechnic charge, said explodable fastener being attached to said swing linkage.

2. The seat assembly for a vehicle of claim 1 wherein said slot is formed in said bracket substantially perpendicularly with respect to said seat track.

3. The seat assembly for a vehicle of claim 1 wherein said pyrotechnic fastener is a nut and bolt assembly.

4. The seat assembly for a vehicle of claim 1 wherein said pyrotechnic fastener is deployable and wherein the deployment of said pyrotechnic fastener is calibrated.

5. The seat assembly for a vehicle of claim 1 wherein said seat track includes an inner seat track and said bracket is attached to said inner seat track.

6. A seat assembly for a vehicle comprising:
   a seat pan;
   a seat track;
   a swing linkage;
   a fastener attaching said swing linkage to said track;
   a slot formed in said frame adjacent said fastener; and
   an explodable fastener attached to said swing linkage; and
      a remote initiator attached to said explodable fastener.

7. The seat assembly for a vehicle of claim 6 wherein said seat track includes a bracket and wherein said fastener is attached to said bracket.

8. The seat assembly for a vehicle of claim 7 wherein said seat track includes an inner seat track and said bracket is attached to said inner seat track.

9. The seat assembly for a vehicle of claim 7 wherein said slot is formed in said bracket.

10. The seat assembly for a vehicle of claim 9 wherein said slot is formed in said bracket substantially perpendicularly with respect to said seat track.

11. The seat assembly for a vehicle of claim 9 wherein said pyrotechnic fastener is deployable and wherein the deployment of said pyrotechnic fastener is calibrated.

12. The seat assembly for a vehicle of claim 6 wherein said pyrotechnic fastener is a nut and bolt assembly.

13. The seat assembly for a vehicle of claim 6 wherein said seat pan has a rear portion and said seat track has a rear portion and wherein said rear portion of said seat pan is attached to said rear portion of said seat track by an arm.

14. A seat assembly for a vehicle comprising:
- a seat pan;
- a seat track, said track having a long axis;
- a bracket attached to said track;
- a swing linkage;
- a fastener attaching said swing linkage to said bracket;
- a slot formed in said bracket adjacent said fastener, said slot being substantially perpendicular to said long axis of said track; and
- an explodable fastener attached to said swing linage, said explodable fastener including a bolt, said bolt having a pyrotechnic charge.

15. The seat assembly for a vehicle of claim 14 wherein said seat track includes an inner seat track and said bracket is attached to said inner seat track.

16. The seat assembly for a vehicle of claim 14 wherein said swing linkage includes an upper portion and said bracket includes an upper portion and wherein said pyrotechnic fastener connects said upper portion of said swing linkage with said upper portion of said bracket.

17. The seat assembly for a vehicle of claim 14 wherein said seat pan has a rear portion and said seat track has a rear portion and wherein said rear portion of said seat pan is attached to said rear portion of said seat track by an arm.

18. The seat assembly for a vehicle of claim 14 wherein said pyrotechnic fastener is a nut and bolt assembly.

19. The seat assembly for a vehicle of claim 18 wherein said pyrotechnic fastener is deployable and wherein the deployment of said pyrotechnic fastener is calibrated.

\* \* \* \* \*